United States Patent
Fu et al.

(10) Patent No.: US 7,548,908 B2
(45) Date of Patent: Jun. 16, 2009

(54) DYNAMIC BLOOM FILTER FOR CACHING QUERY RESULTS

(75) Inventors: Yun Fu, Sunnyvale, CA (US); Zhichen Xu, San Jose, CA (US); Jianchang Mao, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 291 days.

(21) Appl. No.: 11/475,427

(22) Filed: Jun. 26, 2006

(65) Prior Publication Data

US 2006/0294311 A1     Dec. 28, 2006

Related U.S. Application Data

(60) Provisional application No. 60/693,735, filed on Jun. 24, 2005.

(51) Int. Cl.
*G06F 7/00* (2006.01)
(52) U.S. Cl. .......................................................... 707/3
(58) Field of Classification Search ................ 707/1–10
See application file for complete search history.

(56) References Cited

U.S. PATENT DOCUMENTS 6,920,477 B2 * 7/2005 Mitzenmacher ............. 709/203
7,369,557 B1 * 5/2008 Sinha ......................... 370/392
2005/0120004 A1 * 6/2005 Stata et al. ..................... 707/3

OTHER PUBLICATIONS

Mark Fischer, Coding Bloom Filter, Sep. 11, 2000.*

* cited by examiner

*Primary Examiner*—Wilson Lee
(74) *Attorney, Agent, or Firm*—Seth H. Ostrow; Ostrow Kaufman & Frankl LLP

(57) ABSTRACT

Methods, systems, and machine-readable media are disclosed for searching a corpus of information by utilizing a Bloom filter for caching query results. According to one aspect of the present invention, a method of caching information from a corpus of information can include populating one or more Bloom filters with a plurality of bits representative of information in the corpus of information. A search request can be received identifying requested information from the corpus of information. One or more bits in the filter(s) associated with the requested information can be checked and the requested information can be retrieved from the corpus of information based on results of said checking. Furthermore, the filter(s) can be used to determine which information to make available to a particular user in a system where certain information is associated with or access is limited to certain users or groups of users.

20 Claims, 6 Drawing Sheets

DYNAMIC BLOOM FILTER FOR CACHING QUERY RESULTS

The present application claims the benefit of U.S. Provisional application No. 60/693,735, entitled "DYNAMIC BLOOM FILTER FOR CACHING QUERY RESULTS," filed Jun. 24, 2005, the disclosure of which is hereby incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the patent and trademark office patent files or records, but otherwise reserves all copyright rights whatsoever.

BACKGROUND OF THE INVENTION

The present invention relates in general to searching a corpus of documents, and in particular to search systems and methods utilizing a Bloom filter for caching query results.

The World Wide Web (Web) provides a large collection of interlinked information sources in various formats including texts, images, and media content and relating to virtually every subject imaginable. As the Web has grown, the ability of users to search this collection and identify content relevant to a particular subject has become increasingly important, and a number of search service providers now exist to meet this need. In general, a search service provider publishes a Web page via which a user can submit a query indicating what the user is interested in. In response to the query, the search service provider generates and transmits to the user a list of links to Web pages or sites considered relevant to that query, typically in the form of a "search results" page.

Query response generally involves the following steps. First, a pre-created index or database of Web pages or sites is searched using one or in more search terms extracted from the query to generate a list of hits (usually target pages or sites, or references to target pages or sites, that contain the search terms or are otherwise identified as being relevant to the query). Next, the hits are ranked according to predefined criteria, and the best results (according to these criteria) are given the most prominent placement, e.g., at the top of the list. The ranked list of hits is transmitted to the user, usually in the form of a "results" page (or a set of interconnected pages) containing a list of links to the hit pages or sites. Other features, such as sponsored links or advertisements, may also be included on the results page.

Such systems, as well as other very large information query systems, require a significant amount of on-demand database processing. For example, when responding to a query, multiple database "join" operations may be performed over several large database tables when searching the index or database of web pages. In such a large database, these operations may take a long time to process and thus extend the user experienced end-to-end response time.

One solution to provide a quicker end-to-end response time has been to pre-compute and cache potential search results. Using such a cache, a front end of a search system can process a user's query and return the result quickly from the cache rather than performing a more extensive and time-consuming search of the entire database. However, such a system has significant disadvantages. First, since users' interests and needs can vary widely, user requested data may be expansive and occupy a significant amount of cache storage. Therefore, caching useful amounts of such data is infeasible in a very large system. Additionally, some search results may be, by the nature of the system and/or the information stored therein, confidential or otherwise restricted to use by certain users or relatively small groups of users. Therefore, caching such results would not be very helpful or efficient.

Thus, it would be desirable to provide a more efficient way to perform searches of a large corpus of information and return results to the end user quickly.

BRIEF SUMMARY OF THE INVENTION

Embodiments of the present invention provide search systems and methods using Bloom filters to accelerate database operations. As will be described herein, one or more Bloom filters can be used to represent the contents of a corpus of information. Search queries received by a search system can be screened against the Bloom filter(s) to identify and locate the targets of the query. Furthermore, the filter(s) can be used to determine which information to make available to a particular user in a system where certain information is associated with or access is limited to certain users or groups of users.

According to one aspect of the present invention, a method of caching information from a corpus of information can include populating a Bloom filter with a plurality of bits representative of information in the corpus of information. A search request can be received identifying requested information from the corpus of information. One or more bits in the Bloom filter associated with the requested information can be checked and the requested information can be retrieved from the corpus of information based on results of said checking.

According to another aspect of the present invention, populating a Bloom filter with a plurality of bits representative of information in the corpus of information can include determining whether the requested information is represented in the Bloom filter in response to receiving a search request identifying requested information from the corpus of information. In response to determining that the requested information is not represented in the Bloom filter, a decision can be made determining whether to represent the requested information in the Bloom filter. In response to determining to represent the requested information in the Bloom filter, the requested information can be added to the Bloom filter. In response to determining that the requested information is represented in the Bloom filter, a decision can be made determining whether to continue representing the requested information in the Bloom filter. In response to determining to continue representing the requested information in the Bloom filter, old data associated with the requested information can be removed from the Bloom filter and new data associated with the requested information can be added to the Bloom filter. In response to determining to not continue representing the requested information in the Bloom filter, old data associated with the requested information can be removed from the Bloom filter.

According to yet another aspect of the present invention, removing old data associated with the requested information from the Bloom filter can include identifying one or more bits in the Bloom filter associated with the requested information. A decision can be made determining whether the identified bits are equal to or less than a minimum value. In response to determining that the identified bits are not equal to or less than the minimum value, the identified bits can be decremented. In response to determining that the identified bits are equal to or less than the minimum value, an indication that the identified bits are equal to or less than the minimum value can be recorded in an underflow cache. A decision can be made determining whether the underflow cache indicates an underflow condition. In response to determining that the underflow cache indicates an underflow condition, the Bloom filter can be cleaned. Adding new data associated with the requested information to the Bloom filter can include identifying one or more bits in the Bloom filter associated with the requested information. A decision can be made determining whether the identified bits are equal to or greater than a maximum value. In response to determining that the identified bits are not equal to or greater than the maximum value, the identified bits can be incremented.

According to yet another aspect of the present invention, removing old data associated with the requested information from the Bloom filter and adding new data associated with the requested information to the Bloom filter can include inserting a new version of the requested information and an end mark for the new version of the requested information into the Bloom filter. A start mark for the new version of the requested information can be inserted into the Bloom filter and a start mark for an old version of the requested information can be removed from the Bloom filter. The process can wait a predetermined period of time. An end mark for the old version of the requested information and the old version of the requested information can be removed from the Bloom filter

DETAILED DESCRIPTION OF THE INVENTION

Embodiments of the present invention provide search systems and methods using Bloom filters to accelerate database operations. As is known in the art, a Bloom filter is a bitmap representing memberships of a set of elements. Hashing the elements, e.g., the corpus of information, generates the bitmap. Accordingly, a Bloom filter can be used to summarize existence of data elements in a database with a limited number of bits for each data element. As will be described herein, one or more Bloom filters can be used to represent the contents of a corpus of information. According to one embodiment of the present invention, search queries received by a search system can be screened against the Bloom filter(s) to identify and locate the targets of the query. Furthermore, the filter(s) can be used to determine which information to make available to a particular user in a system where certain information is associated with certain users or where access to certain information is limited to certain users or groups of users.

According to another embodiment of the present invention and as will be described in detail below, a non-blocking client-daemon system can be used to update and share a Bloom filter on an ongoing, dynamic basis as documents in the database are accessed. In such a case, a back-end daemon can update the Bloom filter in advance of a user query and a front-end client can utilize the filter to reduce the computational overhead when processing user queries.

In some embodiments, the systems and methods described herein are used for searching a large corpus of information where some or all of the information is subject to usage constraints. For example, using Bloom filters to accelerate database operations is considered to be useful in combination with trusted networks such as those described in co-pending U.S. patent application Ser. No. 11/082,202, entitled "Search System and Methods with Integration of User Annotations from a Trust Network," filed on Mar. 15, 2005, the contents of which are incorporated herein by reference. It is to be understood that the systems and methods described herein are equally applicable to any search system or other database system; discussion of trust networks or other specifics are offered by way of example only and are not intended to limit the scope of the invention.

Figure 1:
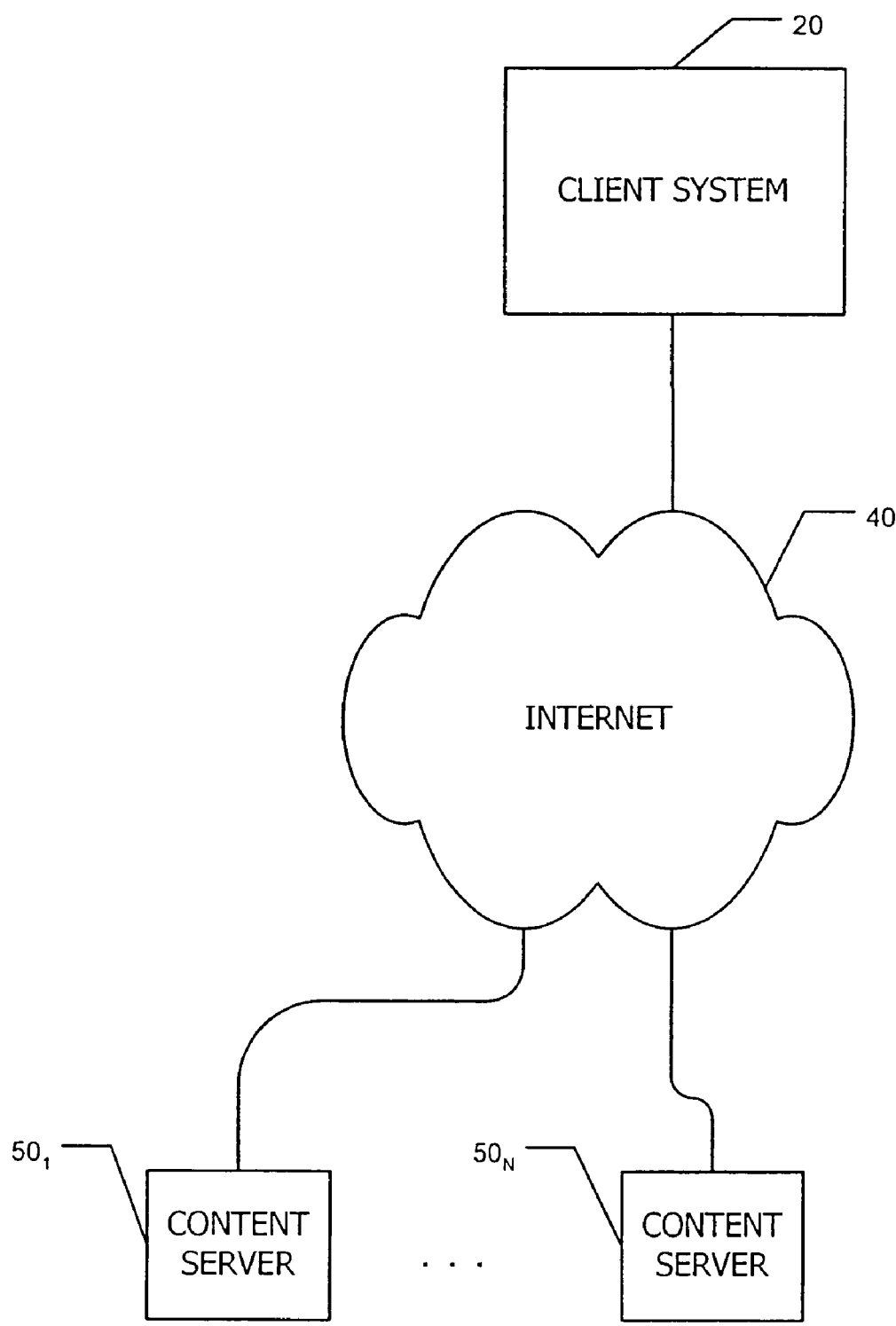
FIG. 1 is a block diagram of an information retrieval and communication network according to one embodiment of the present invention.

FIG. 1 is a block diagram of an information retrieval and communication network according to one embodiment of the present invention. This example illustrates a general overview of an information retrieval and communication network 10 including a client system 20. In computer network 10, client system 20 is coupled through the Internet 40, or other communication network, e.g., over any local area network (LAN) or wide area network (WAN) connection, to any number of server systems $50_1$ to $50_N$. As will be described herein, client system 20 is configured according to the present invention to communicate with any of server systems $50_1$ to $50_N$, e.g., to access, receive, retrieve and display media content and other information such as web pages.

Several elements in the system shown in FIG. 1 include conventional, well-known elements that need not be explained in detail here. For example, client system 20 could include a desktop personal computer, workstation, laptop, personal digital assistant (PDA), cell phone, or any Wireless Access Protocol (WAP) enabled device or any other computing device capable of interfacing directly or indirectly to the Internet. Client system 20 typically runs a browsing program, such as Microsoft's Internet Explorer™ browser, Netscape Navigator™ browser, Mozilla™ browser, Opera™ browser, or a WAP-enabled browser in the case of a cell phone, PDA or other wireless device, or the like, allowing a user of client system 20 to access, process and view information and pages available to it from server systems $50_1$ to $50_N$ over Internet 40. Client system 20 also typically includes one or more user interface devices 22, such as a keyboard, a mouse, touch screen, pen or the like, for interacting with a graphical user interface (GUI) provided by the browser on a display (e.g., monitor screen, LCD display, etc.), in conjunction with pages, forms and other information provided by server systems $50_1$ to $50_N$ or other servers. The present invention is suitable for use with the Internet, which refers to a specific global inter-network of networks. However, it should be understood that other networks can be used instead of or in addition to the Internet, such as an intranet, an extranet, a virtual private network (VPN), a non-TCP/IP based network, any LAN or WAN or the like.

According to one embodiment, client system 20 and all of its components are operator configurable using an application including computer code run using a central processing unit such as an Intel Pentium™ processor, AMD Athlon™ processor, or the like or multiple processors. Computer code for operating and configuring client system 20 to communicate, process and display data and media content as described herein is preferably downloaded and stored on a hard disk, but the entire program code, or portions thereof, may also be stored in any other volatile or non-volatile memory medium or device as is well known, such as a ROM or RAM, or provided on any media capable of storing program code, such as a compact disk (CD) medium, a digital versatile disk (DVD) medium, a floppy disk, and the like. Additionally, the entire program code, or portions thereof, may be transmitted and downloaded from a software source, e.g., from one of server systems $50_1$ to $50_N$ to client system 20 over the Internet, or transmitted over any other network connection (e.g., extranet, VPN, LAN, or other conventional networks) using any communication medium and protocols (e.g., TCP/IP, HTTP, HTTPS, Ethernet, or other conventional media and protocols).

It should be appreciated that computer code for implementing aspects of the present invention can be C, C++, HTML, XML, Java, JavaScript, etc. code, or any other suitable scripting language (e.g., VBScript), or any other suitable programming language that can be executed on client system 20 or compiled to execute on client system 20. In some embodiments, no code is downloaded to client system 20, and needed code is executed by a server, or code already present at client system 20 is executed.

Figure 2:
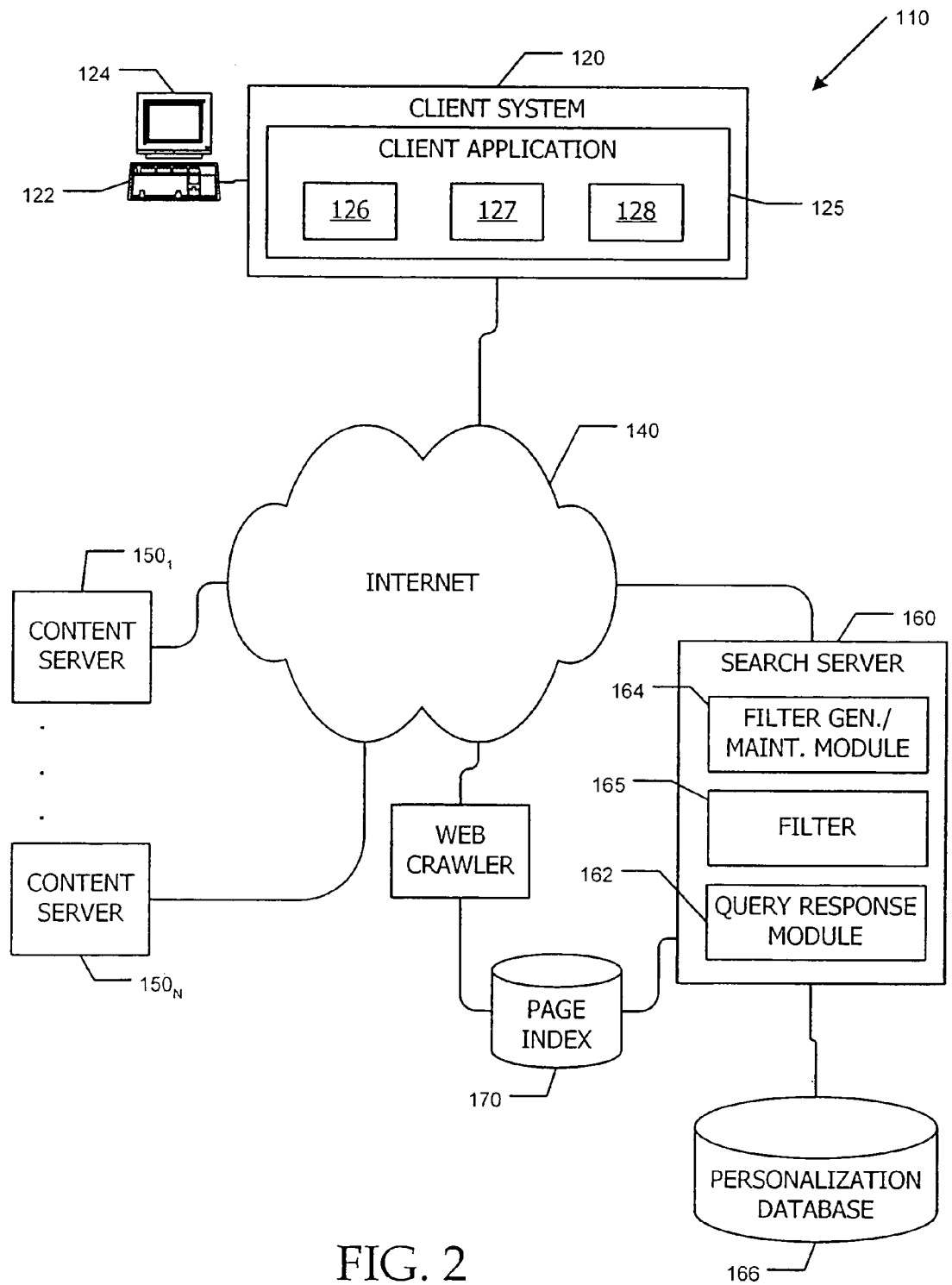
FIG. 2 is a block diagram of an information retrieval and communication network according to another embodiment of the present invention.

FIG. 2 is a block diagram of an information retrieval and communication network according to another embodiment of the present invention. This example illustrates another information retrieval and communication network 110 for communicating media content. As shown, network 110 includes client system 120, one or more content server systems 150, and a search server system 160. In network 110, client system 120 is communicably coupled through Internet 140 or other communication network to server systems 150 and 160. As described above, client system 120 and its components are configured to communicate with server systems 150 and 160 and other server systems over the Internet 140 or other communication networks.

According to one embodiment, a client application (represented as module 125) executing on client system 120 includes instructions for controlling client system 120 and its components to communicate with server systems 150 and 160 and to process and display data content received therefrom. Client application 125 is preferably transmitted and downloaded to client system 120 from a software source such as a remote server system (e.g., server systems 150, server system 160 or other remote server system), although client application module 125 can be provided on any software storage medium such as a floppy disk, CD, DVD, etc., as described above. For example, in one aspect, client application module 125 may be provided over the Internet 140 to client system 120 in an HTML wrapper including various controls such as, for example, embedded JavaScript or Active X controls, for manipulating data and rendering data in various objects, frames and windows.

Additionally, client application module 125 includes various software modules for processing data and media content, such as a specialized search module 126 for processing search requests and search result data, a user interface module 127 for rendering data and media content in text and data frames and active windows, e.g., browser windows and dialog boxes, and an application interface module 128 for interfacing and communicating with various applications executing on client 120. Examples of applications executing on client system 120 with which application interface module 128 is preferably configured to interface according to aspects of the present invention include various e-mail applications, instant messaging (IM) applications, browser applications, document management applications and others. Further, user interface module 127 may include a browser, such as a default browser configured on client system 120 or a different browser.

According to one embodiment, search server system 160 is configured to provide search result data and media content to client system 120, and content server system 150 is configured to provide data and media content such as web pages to client system 120, for example, in response to links selected in search result pages provided by search server system 160. In some variations, search server system 160 returns content as well as, or instead of, links and/or other references to content.

Query response module 162 in one embodiment references various page indexes 170 that are populated with, e.g., pages, links to pages, data representing the content of indexed pages, etc. Page indexes may be generated by various collection technologies including an automatic web crawler 172, and/or various spiders, etc., as well as manual or semi-automatic classification algorithms and interfaces for classifying and ranking web pages within a hierarchical structure. These technologies may be implemented in search server system 160 or in a separate system (e.g., web crawler 172) that generates a page index 170 and makes it available to search server system 160. Various page index implementations and formats are known in the art and may be used for page index 170.

Query response module 162 is configured to provide data responsive to various search requests (queries) received from a client system 120, in particular from search module 126. As used herein, the term "query" encompasses any request from a user (e.g., via client 120) to search server 160 that can be satisfied by searching the Web (or other corpus) indexed by page index 170. In one embodiment, a user is presented with a search interface via search module 126. The interface may include a text box into which a user may enter a query (e.g., by typing), check boxes and/or radio buttons for selecting from predefined queries, a directory or other structure enabling the user to limit search to a predefined subset of the full search corpus (e.g., to certain web sites or a categorical subsection within page index 170), etc. Any search interface may be used.

Query response module 162 is advantageously configured with search related algorithms for processing and ranking web pages relative to a given query (e.g., based on a combination of logical relevance, as measured by patterns of occurrence of search terms extracted from the query; context identifiers associated with search terms and/or particular pages or sites; page sponsorship; connectivity data collected from multiple pages; etc.). For example, query response module 162 may parse a received query to extract one or more search terms, then access page index 170 using the search terms, thereby generating a list of "hits", i.e., pages or sites (or references to pages or sites) that are determined to have at least some relevance to the query. Query response module 162 may then rank the hits using one or more ranking algorithms. Particular algorithms for identifying and ranking hits are not critical to the present invention, and conventional algorithms may be used.

Search server system 160 is communicably coupled to a personalization database 166 that stores data pertaining to specific users of search server system 160 and to a page index 170 that provides an index to the corpus to be searched (in some instances, the World Wide Web). Personalization database 166 and page index 170 may be implemented using generally conventional database technologies.

According to one embodiment of the present invention, search server system 160 also includes a filter generation and maintenance module 164 configured to generate and maintain Bloom filter 165 for a corpus of information such as page index 170 and/or personalization database 166. Filter generation and maintenance module 164 in one embodiment generates a Bloom filter representing the contents of the corpus of information such as page index 170 and/or personalization database 166. As is known in the art, a Bloom filter is a bitmap representing memberships of a set of elements, where the bitmap is generated by hashing the elements. In one embodiment of the present invention, a Bloom filter is used to summarize existence of data elements in a database with a limited number of bits for each data element. According to one embodiment of the present invention, a Bloom filter 165 is generated and maintained for page index 170, personalization database 166, and/or another corpus of information to represent that set of elements. The filter can then be used to determine whether a specified document, a set of specified documents, or other information identified by a search query is included in a particular set. Furthermore, the filter 165 can be used to determine which information to make available to a particular user in a system where certain information is associated with certain users or groups of users or where access is limited to certain users or groups of users.

For example, personalization database 166 may include information relating to a trust network or other information defining groups of users and influencing their access to certain information. So, one possible query is to determine whether a set of documents, or other information, is accessible to a particular user. Filter 165, which represents membership of a set of some number n of elements A={d1, d2, ..., dn} can be a bitmap consisting of m bits, all initialized to 0. A number k of independent hash functions {h1, h2, ..., hk} are defined, where each hash function maps a data element to a position [1 ... m] in the bit map. Therefore, for each element $d_i$ (i in [1 ... n]) in A, a set of bits whose positions are identified by $h_1(d_i), h_2(d_i), \ldots, h_k(d_i)$ are set to 1. When querying whether an element d exists in A, the bits at $h_1(d), h_2(d), \ldots, h_k(d)$ can be checked. If not all the bits are 1, then d must not be in A. If all of the bits are 1, d is possibly in A, with the probability depending upon the size m of the filter and the number k of hash functions. In this way, the members of a set of elements can be quickly identified without the need to perform time-consuming database "join" operations, assuming query for $d_i$ requires a join.

It will be appreciated that the search system described herein is illustrative and that variations and modifications are possible. The content server and search server system may be part of a single organization, e.g., a distributed server system such as that provided to users by Yahoo! Inc., or they may be part of disparate organizations. Each server system generally includes at least one server and an associated database system, and may include multiple servers and associated database systems, and although shown as a single block, may be geographically distributed. For example, all servers of a search server system may be located in close proximity to one another (e.g., in a server farm located in a single building or campus), or they may be distributed at locations remote from one another (e.g., one or more servers located in city A and one or more servers located in city B). Thus, as used herein, a "server system" typically includes one or more logically and/or physically connected servers distributed locally or across one or more geographic locations; the terms "server" and "server system" are used interchangeably. In addition, the query response module, filter generation module, and filter described herein may be implemented on the same server or on different servers.

The search server system may be configured with one or more page indexes and algorithms for accessing the page index(es) and providing search results to users in response to search queries received from client systems. The search server system might generate the page indexes itself, receive page indexes from another source (e.g., a separate server system), or receive page indexes from another source and perform further processing thereof (e.g., addition or updating of various page information). In addition, while the search server system is described as including a particular combination of component modules, it is to be understood that a division into modules is purely for convenience of description; more, fewer, or different modules might be defined.

Figure 3:
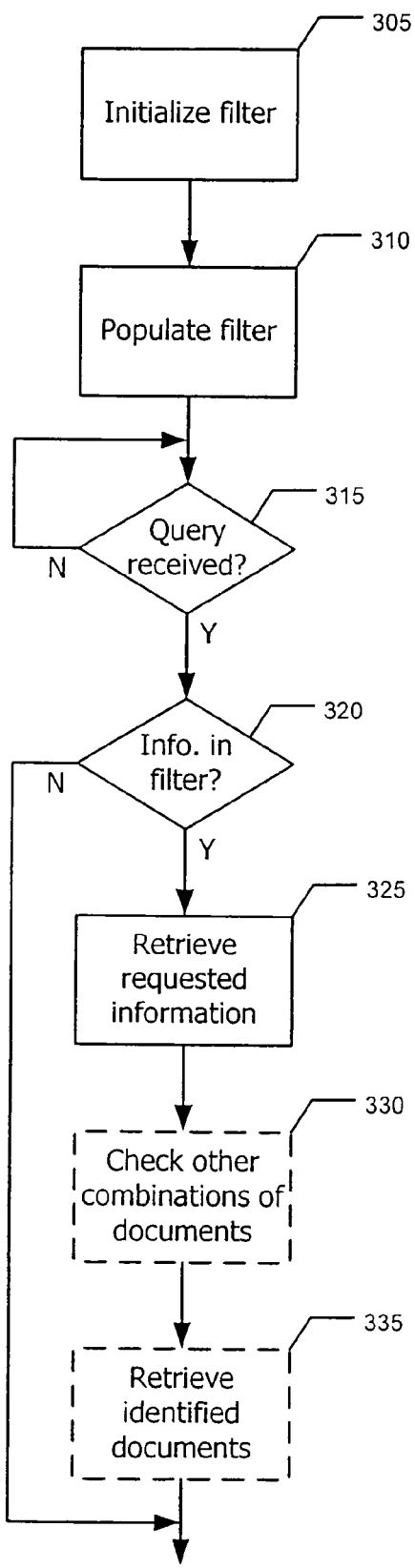
FIG. 3 is a flowchart illustrating a process for using a Bloom filter to accelerate database operations according to one embodiment of the present invention.

FIG. 3 is a flowchart illustrating a process for using a Bloom filter to accelerate database operations according to one embodiment of the present invention. As discussed above, the filter is initialized, for example, by setting (step 305) all bits to 0. The filter can be populated (step 310) to represent a given data store or corpus of information. The filter can be populated in a variety of ways but, as described above, generally consists of performing a number of hashes on elements of the data store. Additional details of one possible method of populating the filter will be discussed below with reference to FIG. 5.

Once a query or search request is received (step 315), a decision (step 320) is made as to whether the requested document or information is represented in the filter. As mentioned above, this decision can be made by hashing the requested document with the hash functions used to generate the filter and checking the corresponding locations in the filter for the status of the bit or bits at that location. If the bit(s) at the location corresponding to the particular hash are on, the document is represented in the filter, indicating that the document is a member of the set represented by the filter. The document can then be retrieved (step 325) and provided to the client requesting the search. In this way, the requested document can be located without the typical database "join" operation.

Optionally, additional documents or other information related to the first document can also be identified in the filter. That is, additional fields in the filter corresponding to each document can be used to identify additional information or related documents. Therefore, an optional check (step 330) can be made for related information and, if found, the related information can be retrieved (step 335) for use by the user requesting the search. In this way, the filter 165 can be used to determine which information to make available to a particular user in a system where certain information is associated with or access is limited to certain users or groups of users such as a trust network or other controlled access system.

For example, in one embodiment where documents can be rated or otherwise annotated by users the fields "Doc" (identifying the document) and "User" (identifying a user who annotated it) are stored in a predefined encoding format such as v="<Doc>, <User>" in the filter by setting the bits determined by $h_1(v), h_2(v), \ldots, h_k(v)$ to 1. Thus, a document is represented in the filter in association with each user who annotated a document. A special rating mark ("<Doc>, NULL") is also stored in the filter for each document that has been annotated by at least one user. Thus, when querying the ratings for a document (doc1) that a user (u1) is able to access, a check of whether doc1's special rating mark ("doc1, NULL") is in the filter can be performed. If it is in the filter, members uj of u1's trust network can be retrieved and a test can be performed for the presence of possible combinations of doc1 and uj in the filter. If a combination of doc1 and a member uj of the trust network is in the filter, it means there likely exists an annotation by uj that u1 can access. A database "select" operation may then be used to retrieve that annotation. In this way, an expensive database "join" operation can be avoided and the "select" operation can be done efficiently by limiting "select" operations to instances where there is high probability that an entry matching the selection exists.

In some one embodiments of the present invention, a dynamic (or counting) Bloom filter is used to maintain changed data membership. According to this embodiment, the Bloom filter is extended by using multiple bits to act as a virtual bit. This extension is based on the observation that the probability that a number of elements hit the same bit shows a long-tail distribution. For example, there are significantly less bits shared by three data elements than bits shared by two data elements. So when using multiple bits (e.g., 4 bits) to represent a virtual bit, multiple states (e.g., 16 states with 4 bits) can be used for recording the number of elements sharing the virtual bit. If a virtual bit is not zero, it indicates that the bit is set. When an element is removed from the filter, the value of the virtual bits for the element can be decremented.

Figure 4:
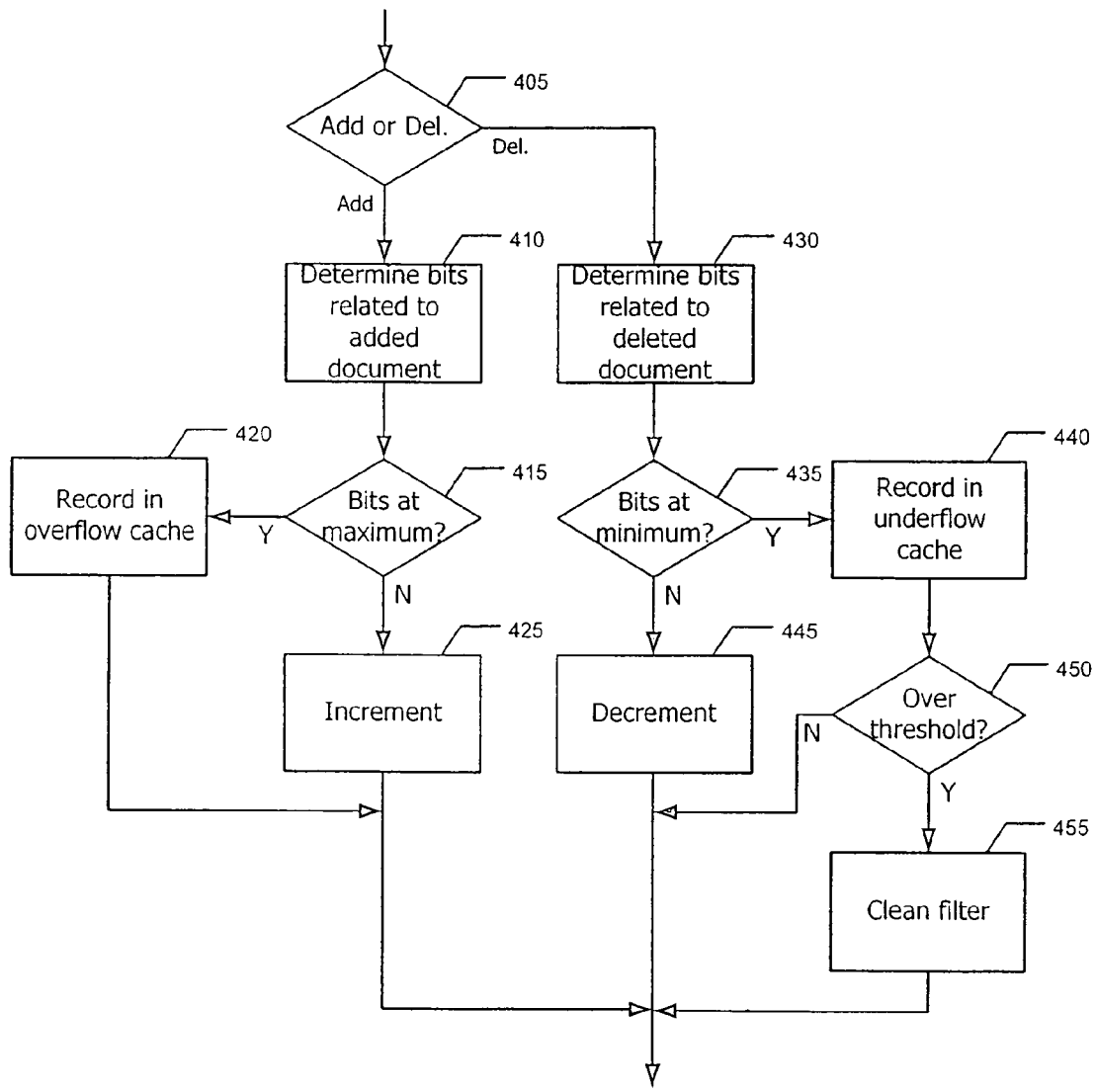
FIG. 4 is a flowchart illustrating a process for dynamic updating of a Bloom filter according to one embodiment of the present invention.

FIG. 4 is a flowchart illustrating a process for dynamic updating of a Bloom filter according to one embodiment of the present invention. If (step 405) an element is being added to the filter, the virtual bits related to the added document are identified (step 410). According to one embodiment, the virtual bits in the filter representing the document are determined by applying the hash functions to that document.

Once the virtual bits related to the added document are identified, a check (step 415) is performed to determine whether the identified virtual bit is at or exceeds a maximum value. That is, using the example introduced above, with four bits per virtual bit, up to 16 states can be identified. If (at step 415) the virtual bit is at its maximum value, it cannot be incremented further. In this case, the additional bit indicating the added document can be recorded (step 420) in an overflow cache. If (at step 415) the virtual bit has not reached its maximum, the virtual bit can be incremented (step 425) to indicate the addition of the new document.

If (at step 405) a document is being deleted from the filter, the bits related to the added document are identified (step 430), the location of which may be determined by the hash function for that document. Once the bits related to the document being deleted are identified at step 430, a check (step 435) is performed to determine whether the identified bits are indicating a minimum value. For example, a minimum value might be zero although another value may also be used. If at step 435 the virtual bit is already indicating its minimum value, it cannot be decremented further. In this case, the bits indicating the deleted document can be recorded (step 440) in an underflow cache. If at step 435 the virtual bit has not reached its minimum, the virtual bit can be decremented (step 445) to indicate the deletion of the document.

According to one embodiment, if at 435 the virtual bit is already indicating its minimum value and the bits indicating the deleted document are recorded (step 440) in the underflow cache, the value of the underflow cache can be checked (step 450) against a threshold value. The threshold value may be zero since the virtual bits indicate the number of related documents and decrementing the virtual bit beyond zero may indicate a problem with the filter. Therefore, if at step 450 the underflow cache indicates a value over this threshold, the filter can be cleaned (step 455). According to one embodiment, cleaning the filter can include initializing all values in the filter and generating a new filter. Alternatively, cleaning the filter at step 455 can comprise initializing, i.e., setting to logical 0, the bit or bits in the filter representing the document as determined by the hash function for that document and generating new bit(s) for that document.

In summary, updating of the Bloom filter according to one embodiment of the present invention works as follows. Initially, all virtual bits are set to 0. When adding an element d to the Bloom filter, virtual bits determined by hashing functions $h_1(d), h_2(d), \ldots, h_k(d)$ are incremented by 1. If a virtual bit reaches the maximum value, the bit is not incremented but the position of the virtual bit(s) are recorded in the overflow cache. If the element d is removed from the Bloom filter, virtual bits determined by $h_1(d), h_2(d), \ldots, h_k(d)$ are decremented by 1. If a bit is already 0, it is not decremented anymore. If a bit changes to 0 from a positive value and the bit position is recorded in the overflow cache, setting the bit to 0 may introduce a false negative for the membership of some data elements. However, the occurrence of such underflow bits can be detected and the Bloom filter can be recovered by cleaning the entire Bloom filter or a portion thereof as described above.

According to one embodiment, the Bloom filter is implemented using shared memory so that it can be shared among multiple processes, each of which acts as a client (or consumer) of the Bloom filter; that is multiple processes can process data retrieval queries by reading the same Bloom filter. A background daemon runs as a server (or producer) to populate the Bloom filter based on predictions of documents likely to be requested. To identify such documents, the daemon shares a FIFO queue with all client processes; the client processes insert all accessed documents (or references thereto) to the FIFO queue, and the daemon reads the queue to monitor, e.g., the most recently accessed and/or most popular documents.

Figure 5:
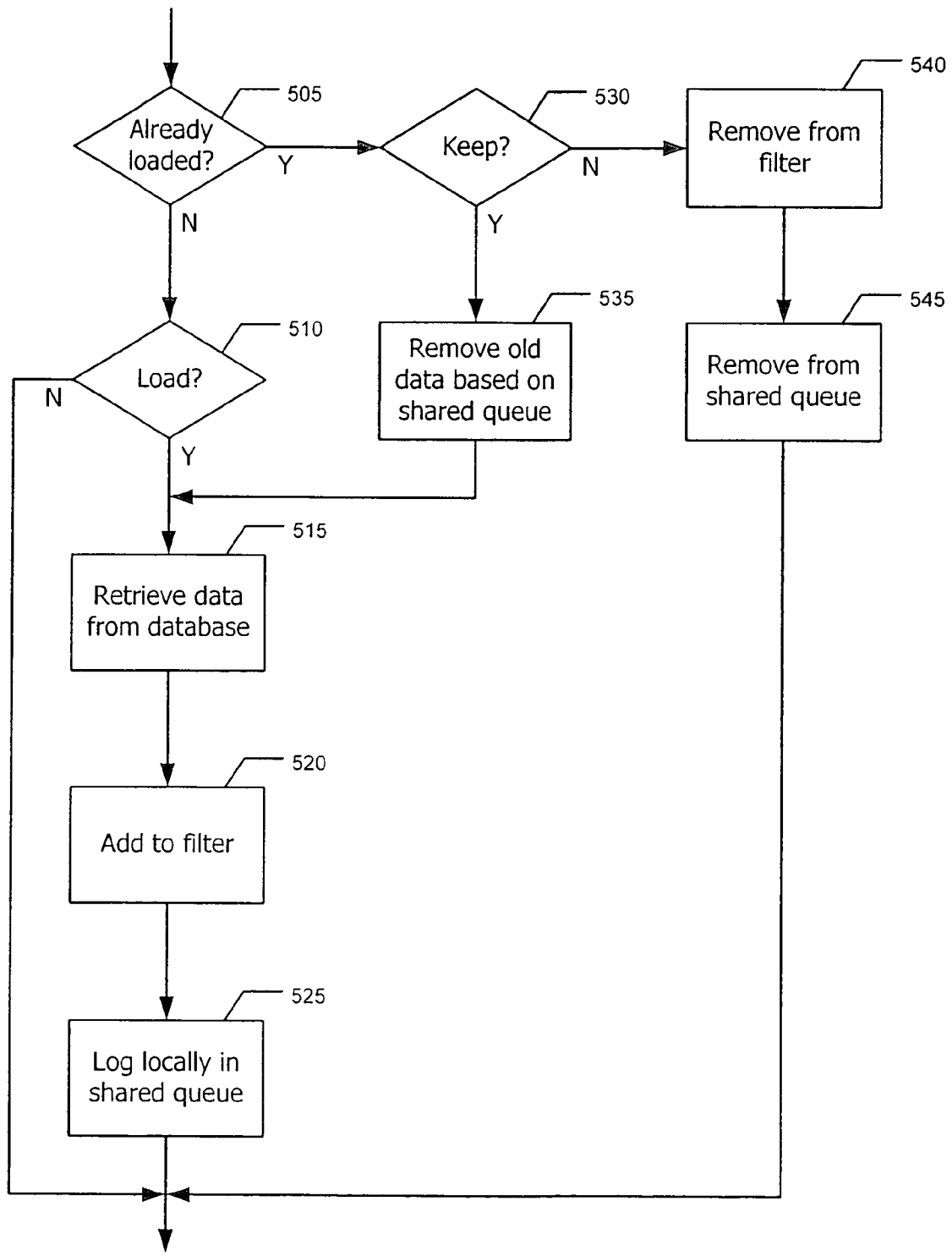
FIG. 5 is a flowchart illustrating a process for populating a Bloom filter based on prediction of requested documents according to one embodiment of the present invention.

FIG. 5 is a flowchart illustrating a process for populating a Bloom filter based on prediction of requested documents according to one embodiment of the present invention. When a document is accessed, a check (step 505) can be made to determine if the document is already loaded (or included) in the filter. If at step 505 the document is not already in the filter, a determination (step 510) can be made as to whether to include the document. This determination can be based on a number of factors that may include most recently accessed documents, most popular documents, document ratings by users, etc. If at step 510 it is decided to add the document to the filter, the document and/or data related to that document can be retrieved (step 515) and added (step 520) to the filter, e.g., using the process described above with reference to FIG. 4. The added document can also be logged (step 525) locally in the shared queue by the daemon.

If at step 505 an accessed document is already in the filter, a decision (step 530) can be made as to whether to keep the document in the filter. This decision can be based on a number of factors that may include most recently accessed documents, most popular documents, document ratings by users, etc. If at step 530 a decision is made to keep the document in the filter, the filter can be updated to reflect any changes to the documents or related data. To update the filter, the old related to the document and stored in the filter can be removed (step 535), e.g., by the process described above with reference to FIG. 4. The data related to the document can be located in the filter using the local log or shared queue. After the filter data related to the document has been removed at step 535, the document and/or data related to that document can be retrieved (step 515) and added (step 520) to the filter, e.g., using the process described above with reference to FIG. 4. The added document can also be logged (step 525) locally in the shared queue by the daemon.

If at step 505 an accessed document is already in the filter, and a decision at step 530 is made to not keep the document in the filter, the document can be removed from the filter, e.g., using the process described above with reference to FIG. 4. Additionally, the information related to the document can be removed (step 545) from the local log or shared queue.

To summarize the embodiment illustrated in FIG. 5, if the daemon determines to load information related to a document (such as the document's ratings or other annotations) into the shared Bloom filter, it retrieves the ratings from the database, adds the ratings into the Bloom filter, and logs the ratings in a local log, which is used for removing the ratings when they expire. The daemon maintains a number of log files to rotate periodically. Thus if a document's ratings are recorded in a log, they will be refreshed when the log file is rotated to again. Decisions as to which documents should be stored in the filter can be based on predefined criteria such as most recently accessed documents or most popular documents. When refreshing a document's ratings, if the document is still one of the most recently accessed document or most popular documents, old ratings of the document can be removed from the Bloom filter based on the document's ratings logged in the log file, then new ratings can be retrieved from the database and added to the Bloom filter. If the document is not within the most recently accessed documents or most popular documents, i.e. the document's recent access rate doesn't satisfy the predefined criteria, the document's ratings can be removed without inserting it into the Bloom filter again. In this way, the number of ratings stored in the Bloom filter at a given time can be controlled.

The data refresh, data store, and data retrieval operations described above can be protected by a mutex among the various processes accessing the filter. However, if a document has a large number of ratings, the Bloom filter may be locked for a long period of time to update the ratings for the document. As a result users may be blocked from accessing the Bloom filter and may experience slow response from search server. To further improve the system performance, according to one embodiment a non-blocking Bloom filter may be implemented. According to this embodiment, each document may have two versions of its ratings information in the Bloom filter concurrently, an old one and a new one. The versions can be identified by version numbers (e.g., 0, 1) or other suitable identifiers. Thus, for example, a document named doc1 might have two related document names, e.g., doc1#0 and doc1#1, in the filter at a given time. When the daemon refreshes a document, it advantageously uses a version number different from the version already in the filter to add new ratings for the same document, then removes the old ratings by using the old version number.

Figure 6:
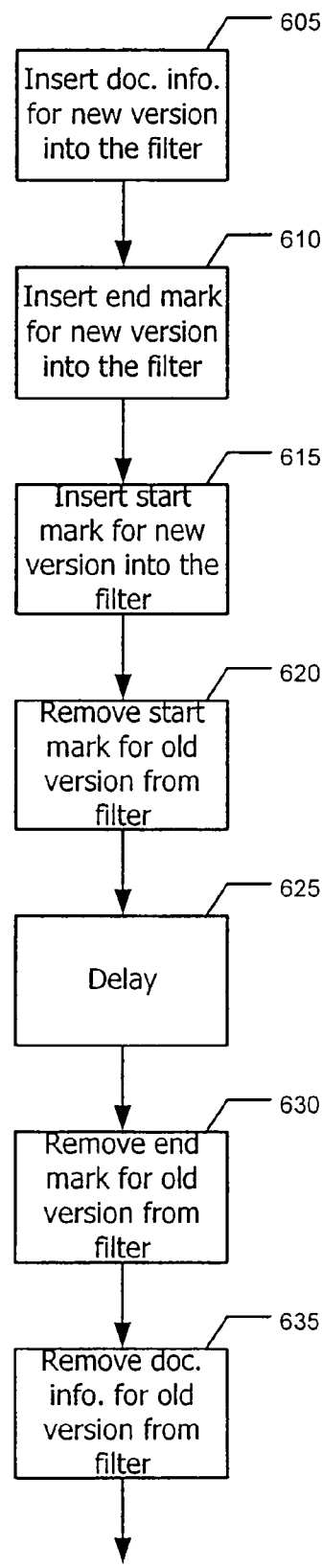
FIG. 6 is a flowchart illustrating a process for updating a Bloom filter without blocking the filter according to one embodiment of the present invention.

FIG. 6 is a flowchart illustrating a process for updating a Bloom filter without blocking the filter according to one embodiment of the present invention. According to this embodiment, the daemon can insert (step 605) information for a new version of the document into the filter. The new version can reflect updated information such as a new rating etc. The daemon also inserts (step 610) an "end" mark for the new version of the document into the filter. A start mark for the new version of the document is also inserted into the filter (step 615), and the start mark for the old version of the file is removed from the filter (step 620). Start marks and end marks are used to determine which version of a document has reliable data at a given time, as described below. The daemon then delays (step 625) or waits a specified period of time to allow any readers currently using the old version to finish with the filter. After expiration of this time, the daemon can remove 630 the end mark for the old version of the document from the filter. Finally, the old version of the document can be removed 635 from the filter.

As shown in FIG. 6, when the daemon inserts a new version of ratings for a document, it does not begin by removing the START and END marks for the old version. Instead, it first inserts all information pertaining to the new version (e.g., new ratings), then sets the new version END and START marks (in that order), then removes the START mark of the old version. After a certain period of delay, it removes the END mark of the old version and all ratings of the old version. By introducing this delay period, any client processes in the middle of scanning old version ratings when the update started will likely have time to read a complete set of old ratings.

From the client process perspective, when a client process retrieves data from the filter, it attempts to use each possible version number (e.g., 0 and 1) one by one to check which version is in the filter. When checking a version (e.g. 0) of a document (e.g. doc 1), the client process first checks if the mark "doc1#0, START" is in the filter. If it is in the filter, the client process reads all ratings or other information for "doc1#0" without locking the filter. At the end, the client process checks if the mark "doc1#0, END" is also in the filter. If it is still in the filter, the integrity of the ratings for "doc1#0" has not been changed while the client was reading. If, however, "doc1#0, END" is not in the filter anymore, the client process may retrieve incomplete ratings for the document.

FIGS. 1 through 6 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; electronic, electromagnetic, optical, acoustical, or other form of propagated signals (e.g., carrier waves, infrared signals, digital signals, etc.); or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

We claim:

1. A computer-implemented method for caching a corpus of information, the method comprising:

populating a dynamic Bloom filter with a plurality of virtual bits, the plurality of virtual bits representative of information comprising the corpus, a given virtual bit operative to support two or more values;

receiving a search request that identifies requested information from the corpus;

checking one or more bits in the Bloom filter associated with the requested information to determine whether the requested information is present in the corpus;

retrieving the requested information from the corpus on the basis of the result of the check;

determining whether the requested information is represented in the Bloom filter;

determining whether to represent the requested information in the Bloom filter where the requested information is not represented in the Bloom filter;

adding the requested information to the Bloom filter in response to the determining step without blocking the Bloom filter;

determining whether to continue to represent the requested information in the Bloom filter where the requested information is represented in the Bloom filter;

removing old data associated with the requested information from the Bloom filter without blocking the Bloom filter and adding new data associated with the requested information to the Bloom filter without blocking the Bloom filter in response to a determination to continue to represent the requested information in the Bloom filter;

removing the old data associated with the requested information from the Bloom filter without blocking the Bloom filter in response to a determination to not continue to represent the requested information in the Bloom filter;

wherein removing old data associated with the requested information from the Bloom filter comprises identifying one or more virtual bits associated with the requested information from the dynamic Bloom filter, determining whether a value of a given identified virtual bit is less than or equal to a minimum value, decrementing the value of the given identified virtual bit where the value of the given identified virtual bit is less than or equal to the minimum value, recording an indication that the given identified virtual bit is less than or equal to the minimum value in an underflow cache where the given identified virtual bit is less than or equal to the minimum value, determining whether the underflow cache indicates an underflow condition, and cleaning the Bloom filter in response to the determination of the existence of an underflow condition.

2. A computer-implemented method for caching a corpus of information, the method comprising:

populating a dynamic Bloom filter with a plurality of virtual bits, the plurality of virtual bits representative of information comprising the corpus, a given virtual bit operative to support two or more values;

receiving a search request that identifies requested information from the corpus;

checking one or more bits in the Bloom filter associated with the requested information to determine whether the requested information is present in the corpus; and retrieving the requested information from the corpus on the basis of the result of the check; and storing one or more of the plurality of virtual bits into an underflow cache to remove old data from the Bloom filter.

3. The method of claim 2 comprising:

determining whether the requested information is represented in the Bloom filter;

determining whether to represent the requested information in the Bloom filter where the requested information is not represented in the Bloom filter; and adding the requested information to the Bloom filter in response to the determining step without blocking the Bloom filter.

4. The method of claim 3 comprising:

determining whether to continue to represent the requested information in the Bloom filter where the requested information is represented in the Bloom filter; and removing old data associated with the requested information from the Bloom filter without blocking the Bloom filter and adding new data associated with the requested information to the Bloom filter without blocking the Bloom filter in response to a determination to continue to represent the requested information in the Bloom filter.

5. The method of claim 4 comprising removing the old data associated with the requested information from the Bloom filter without blocking the Bloom filter in response to a determination to not continue to represent the requested information in the Bloom filter.

6. The method of claim 5 wherein removing old data associated with the requested information from the Bloom filter comprises:
   identifying one or more virtual bits associated with the requested information from the dynamic Bloom filter;
   determining whether a value of a given identified virtual bit is less than or equal to a minimum value; and
   decrementing the value of the given identified virtual bit where the value of the given identified virtual bit is less than or equal to the minimum value.

7. The method of claim 6 comprising repeating the determining and decrementing steps for each of the one or more identified virtual bits.

8. The method of claim 6 comprising recording an indication that the given identified virtual bit is less than or equal to the minimum value in the underflow cache where the given identified virtual bit is less than or equal to the minimum value.

9. The method of claim 1 wherein adding new data associated with the requested information from the Bloom filter comprises:
   identifying one or more virtual bits associated with the requested information from the dynamic Bloom filter;
   determining whether a value of a given identified virtual bit is greater than or equal to a maximum value; and
   incrementing the value of the given identified virtual bit where the value of the given identified virtual bit is greater than or equal to the maximum value.

10. The method of claim 9 comprising repeating the determining and incrementing steps for each of the one or more identified virtual bits.

11. The method of claim 1 wherein populating a Bloom filter with a plurality of bits comprises populating with a plurality of bits representative of information in a personalization database.

12. The method of claim 1 wherein populating a Bloom filter with a plurality of bits comprises populating with a plurality of bits representative of information in a personalization database relating to a trust network.

13. The method of claim 1 wherein populating a Bloom filter with a plurality of bits comprises populating with a plurality of bits representative of information in an index of content items available on a computer network.

14. The method of claim 1 wherein populating a Bloom filter with a plurality of bits comprises populating with a plurality of bits representative of information in an index of content items available on an intranet.

15. The method of claim 1 wherein populating a Bloom filter with a plurality of bits comprises populating with a plurality of bits representative of information in an index of content items available on the Internet.

16. The method of claim 1 wherein populating a Bloom filter with a plurality of bits comprises populating a bit map with the plurality of bits.

17. The method of claim 16 wherein populating the bit map comprises defining one or more hash functions to map information comprising the corpus to one or more positions in the bit map.

18. The method of claim 1 comprising initializing the plurality of bits to zero in the Bloom filter.

19. The method of claim 1 comprising retrieving one or more items of additional information related to the requested information from the corpus on the basis of the result of the check.

20. The method of claim 1 wherein populating comprises populating a non-blocking Bloom filter.

* * * * *